US010879760B2

(12) United States Patent
Baba (10) Patent No.: US 10,879,760 B2
(45) Date of Patent: Dec. 29, 2020

(54) PERMANENT-MAGNET-EMBEDDED ELECTRIC MOTOR FOR COMPRESSOR, COMPRESSOR, AND REFRIGERATION CYCLE DEVICE

(71) Applicant: Mitsubishi Electric Corporation, Tokyo (JP)

(72) Inventor: Kazuhiko Baba, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 58 days.

(21) Appl. No.: 15/555,618

(22) PCT Filed: Jun. 17, 2015

(86) PCT No.: PCT/JP2015/067421
§ 371 (c)(1),
(2) Date: Sep. 5, 2017

(87) PCT Pub. No.: WO2016/203563
PCT Pub. Date: Dec. 22, 2016

(65) Prior Publication Data
US 2018/0048209 A1  Feb. 15, 2018

(51) Int. Cl.
*H02K 5/24* (2006.01)
*H02K 1/14* (2006.01)
(Continued)

(52) U.S. Cl.
CPC ............ *H02K 5/24* (2013.01); *F25B 31/026* (2013.01); *H02K 1/146* (2013.01); *H02K 1/276* (2013.01);
(Continued)

(58) Field of Classification Search
CPC ............ H02K 5/24; H02K 1/46; H02K 1/276; H02K 1/28; H02K 7/14; H02K 2213/03
See application file for complete search history.

(56) References Cited

U.S. PATENT DOCUMENTS 7,531,934 B2 * 5/2009 Hang ................. B22D 19/0054
310/156.56
7,866,957 B2 * 1/2011 Akashi .................... F04B 35/04
310/156.53
(Continued)

FOREIGN PATENT DOCUMENTS

CN    1713484 A    12/2005
CN    102362417 A    2/2012
(Continued)

OTHER PUBLICATIONS

Office Action dated Nov. 16, 2018 issued in corresponding CN patent application No. 201580078275.X (and English translation).
(Continued)

*Primary Examiner* — Thienvu V Tran
*Assistant Examiner* — Bart Iliya
(74) *Attorney, Agent, or Firm* — Posz Law Group, PLC (57) ABSTRACT

A permanent-magnet-embedded electric motor for a compressor includes a stator core and a rotor. The rotor includes a rotor core including a plurality of magnet insertion holes, and an end plate disposed on an end portion of the rotor core in an axial direction of the rotor core. An outer diameter of the end plate is equal to an outer diameter of the rotor core. The end plate is formed of a magnetic material that is more ferromagnetic than a magnetic material of the rotor core. A plurality of through-holes each communicating with corresponding one of the magnet insertion holes are formed in the end plate, the through-holes extending in the axial direction of the rotor.

8 Claims, 6 Drawing Sheets

(51) Int. Cl.
  *H02K 1/27* (2006.01)
  *H02K 7/14* (2006.01)
  *F25B 31/02* (2006.01)
  *H02K 1/28* (2006.01)
  *F25B 13/00* (2006.01)

(52) U.S. Cl.
  CPC .............. *H02K 1/28* (2013.01); *H02K 7/14* (2013.01); *F25B 13/00* (2013.01); *H02K 2213/03* (2013.01)

(56) References Cited

U.S. PATENT DOCUMENTS

| | | | |
|---|---|---|---|
| 9,484,794 B2* | 11/2016 | Finkle | H02K 21/46 |
| 2005/0285468 A1 | 12/2005 | Fukushima et al. | |
| 2008/0145252 A1* | 6/2008 | Ku | F04C 18/3442 |
| | | | 418/54 |
| 2010/0001607 A1* | 1/2010 | Okuma | H02K 1/276 |
| | | | 310/156.53 |
| 2012/0098359 A1 | 4/2012 | Morozumi | |
| 2012/0146336 A1* | 6/2012 | Hori | H02K 1/2766 |
| | | | 290/55 |
| 2014/0175930 A1 | 6/2014 | Adaniya et al. | |

FOREIGN PATENT DOCUMENTS

| | | |
|---|---|---|
| JP | S55-138815 U | 10/1980 |
| JP | S57-061821 U | 4/1982 |
| JP | 09-121517 A | 5/1997 |
| JP | 2000-134882 A | 5/2000 |
| JP | 2003-274591 A | 9/2003 |
| JP | 2004-357430 A | 12/2004 |
| JP | 2005-269874 A | 9/2005 |
| JP | 2008-167649 A | 7/2008 |
| JP | 2013-27258 | 2/2013 |
| JP | 2013-090479 A | 5/2013 |
| JP | 2013-093956 A | 5/2013 |
| JP | 2014-128115 A | 7/2014 |
| JP | 2014-197970 A | 10/2014 |

OTHER PUBLICATIONS

International Search Report of the International Searching Authority dated Sep. 1, 2015 for the corresponding international application No. PCT/JP2015/067421 (and English translation).

Office Action dated Feb. 6, 2018 issued in corresponding JP patent application No. 2017-524194 (and English machine translation thereof).

Office Action dated Jul. 11, 2019 issued in corresponding CN patent application No. 201580078275.X (and English translation).

Office Action dated Feb. 3, 2020 issued in corresponding CN patent application No. 201580078275.X (and English translation).

Office Action dated Oct. 29, 2019 issued in corresponding JP patent application No. 2017-524194 (and English translation).

Office Action dated Sep. 2, 2020 issued in corresponding CN patent application No. 201580078275.X (and English translation).

* cited by examiner

PERMANENT-MAGNET-EMBEDDED ELECTRIC MOTOR FOR COMPRESSOR, COMPRESSOR, AND REFRIGERATION CYCLE DEVICE

CROSS REFERENCE TO RELATED APPLICATION

This application is a U.S. national stage application of International Patent Application No. PCT/JP2015/067421 filed on Jun. 17, 2015, the disclosure of which is incorporated herein by reference.

TECHNICAL FIELD

The present invention relates to a permanent-magnet-embedded electric motor for a compressor, which includes a stator core fixed to a container of the compressor and a rotor disposed on an inner side of the stator core in a radial direction, a compressor, and a refrigeration cycle device.

BACKGROUND

A conventional compressor described in Patent Literature 1 includes a compression element fixed to a container of the compressor and an electric motor that drives the compression element via a rotation shaft. The electric motor includes an annular stator core and a rotor disposed on an inner side of the stator core in a radial direction. The rotor includes a drive shaft, a plurality of sintered rare-earth magnets, a rotor core portion that is provided with magnet insertion holes into which the sintered rare-earth magnets are respectively inserted and that is fixed to the drive shaft penetrating the center of the rotor core portion to be rotated together with the drive shaft, and an end plate of a magnetic metal disposed on an end portion of the rotor core portion in an axial direction. A plurality of pairs of magnet insertion holes arranged to face to each other with the drive shaft therebetween are formed in the rotor core portion. The end plate is formed to have a smaller diameter than the outer diameter of the rotor core portion. Further, the conventional compressor described in Patent Literature 1 is configured in such a manner that a width dimension of the pair of magnet insertion holes in the radial direction is larger than an outer diameter dimension of the end plate.

PATENT LITERATURE

Patent Literature 1: Japanese Patent Application Laid-open No. 2004-357430

In a case of using a flat rotor in which the length of a rotor core in an axial direction is relatively shorter with respect to an outer diameter dimension of the rotor core in a compressor, vibration and noise due to a load change in the compressor become large. To suppress this influence, it is necessary to increase the weight of end plates arranged on both ends of the rotor core in the axial direction to increase an inertial force of the rotor. On the other hand, in a case where the end plate is arranged at a position facing to end portions in the axial direction of permanent magnets inserted into the rotor core, leakage magnetic fluxes leaking from the end portions of the permanent magnets in the axial direction are likely to flow to the end plate, causing reduction of the efficiency of an electric motor. The conventional compressor described in Patent Literature 1 is configured in such a manner that the outer diameter dimension of the end plate is equal to or smaller than the width dimension of the pair of magnet insertion holes in the radial direction. Therefore, in the conventional compressor described in Patent Literature 1, the weight of the end plate per unit height is small, and it is necessary to set a dimension of the end plate in the axial direction to be large in order to acquire an inertial force of the rotor that is necessary for suppressing vibration and noise. Accordingly, the conventional compressor described in Patent Literature 1 has a problem in that a height dimension of the rotor in the axial direction becomes large and a volume of the compressor increases, resulting in increase of a cost of the compressor.

SUMMARY

The present invention has been achieved in view of the above problems, and an object of the present invention is to provide a permanent-magnet-embedded electric motor for a compressor that is capable of suppressing vibration and noise while suppressing reduction of the efficiency of an electric motor.

There is provided a permanent-magnet-embedded electric motor for a compressor according to an aspect of the present invention incorporated in a compressor, the motor including: an annular stator core fixed to an inner circumferential surface of a container of the compressor; and a rotor disposed on an inner side of the stator core, wherein the rotor includes a rotor core including a plurality of magnet insertion holes, and an end plate disposed on an end portion of the rotor core in an axial direction of the rotor core, an outer diameter of the end plate is equal to an outer diameter of the rotor core, the end plate is formed of a magnetic material having higher permeability than permeability of a magnetic material of the rotor core, and a plurality of through-holes each communicating with corresponding one of the magnet insertion holes are formed in the end plate, the through-holes extending in the axial direction of the rotor.

Advantageous Effects of Invention

According to the present invention, an effect is obtained where it is possible to suppress vibration and noise while suppressing reduction of the efficiency of an electric motor.

DETAILED DESCRIPTION

A permanent-magnet-embedded electric motor for a compressor, a compressor, and a refrigeration cycle device according to an embodiment of the present invention will be described in detail below with reference to the accompanying drawings. The present invention is not limited to the embodiment.

Embodiment

Figure 1:
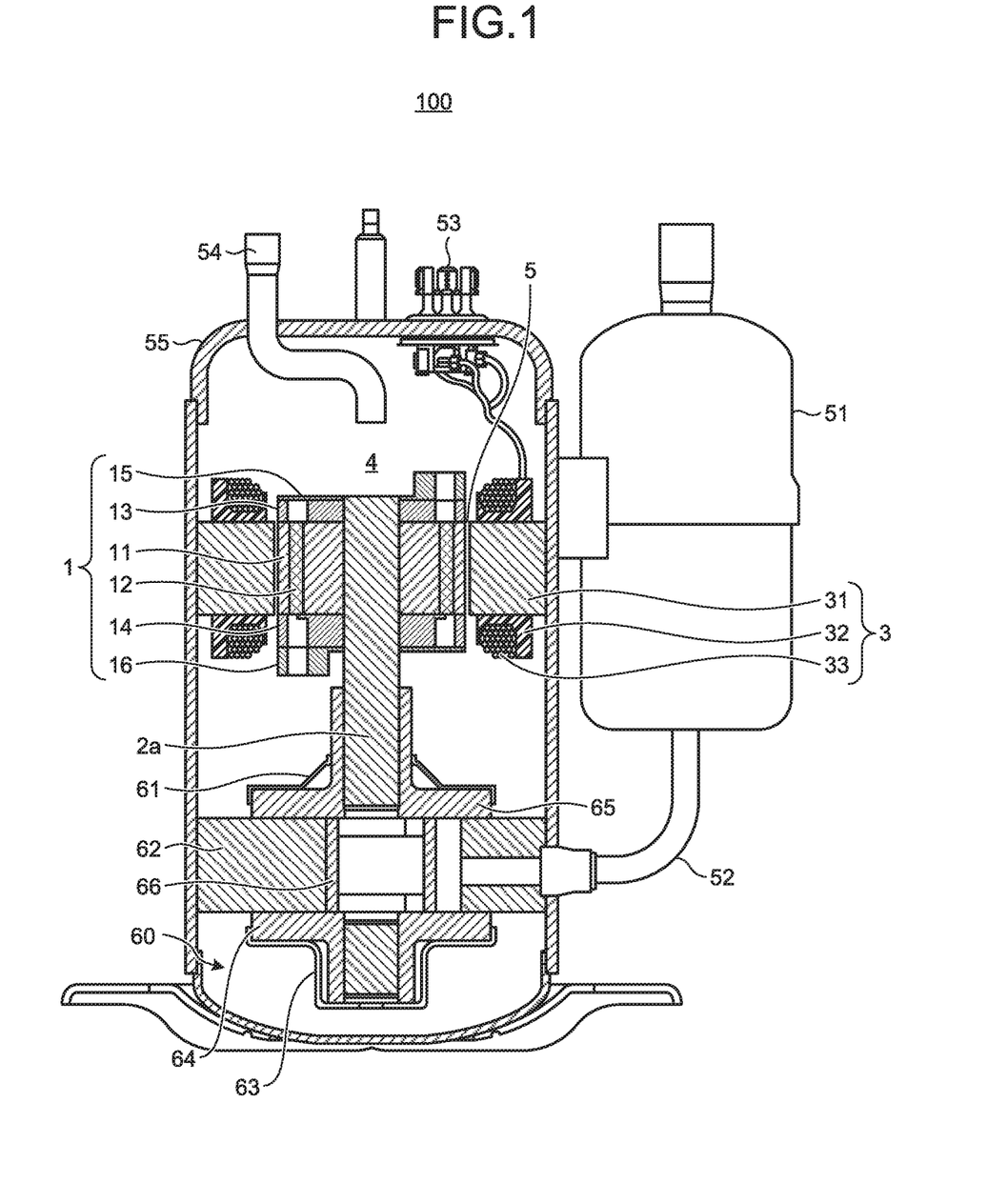
FIG. 1 is a cross-sectional view of a compressor incorporating a permanent-magnet-embedded electric motor for a compressor according to an embodiment of the present invention.

FIG. 1 is a cross-sectional view of a compressor incorporating a permanent-magnet-embedded electric motor for a compressor according to an embodiment of the present invention. A compressor 100 includes an accumulator 51 that separates a refrigerant gas supplied from an evaporator (not illustrated) and a remaining liquid refrigerant from each other, a compression mechanism unit 60 that is arranged in a cylindrical container 55 and compresses the refrigerant gas supplied from the accumulator 51 via an inlet pipe 52, and a permanent-magnet-embedded electric motor for a compressor 4 that is arranged in the container 55 and drives the compression mechanism unit 60. In the following description, the permanent-magnet-embedded electric motor 4 for a compressor is simply referred to as an "electric motor".

The compression mechanism unit 60 includes a cylinder 62 that is fixed to an inside of the container 55 and to which the refrigerant gas from the accumulator 51 is supplied, an upper frame 65 into which one end of a rotation shaft 2 is inserted and which occludes one end of the cylinder 62 in an axial direction, an upper discharge muffler 61 attached to the upper frame 65, a lower frame 64 that occludes the other end of the cylinder 62 in the axial direction, a lower discharge muffler 63 attached to the lower frame 64, and a piston 66 that is disposed in the cylinder 62 and eccentrically rotates within the cylinder 62 together with an eccentric portion 2a arranged on the rotation shaft 2.

The other end of the rotation shaft 2 is inserted into a rotor core 11 constituting the electric motor, and the one end of the rotation shaft 2 is held to be freely rotatable by the upper frame 65 and the lower frame 64 while penetrating an inner space of the cylinder 62. Further, the eccentric portion 2a is formed at the one end of the rotation shaft 2, which compresses a refrigerant together with the piston 66.

The electric motor includes a rotor 1 and a stator 3. The stator 3 is configured by a stator core 31 that is a cylindrical, hollow stack of a plurality of core pieces punched out from an electromagnetic steel plate having a thickness of 0.2 to 0.5 mm and is fixed to an inner circumferential surface of the container 55, an insulator 32 that covers the stator core 31, and a winding 33 wound around the stator core 31 via the insulator 32 in a concentrated winding method or a distributed winding method, to which power from a glass terminal 53 fixed to the container 55 is supplied. The stator core 31 is fixed to the inner circumferential surface of the container 55 by shrink fitting, cool fitting, welding, or press fitting. It is assumed that the stator core 31 also includes an annular back yoke (not illustrated) and a plurality of teeth (not illustrated) disposed on an inner side of the back yoke in a radial direction, and the teeth are disposed to be away from each other in a rotational direction on the inner side of the back yoke in the radial direction. The "rotational direction" is a direction of rotation of the rotor 1.

The rotor includes a rotor core 11 that is formed by stacking a plurality of core pieces punched out from an electromagnetic steel plate and is disposed on an inner side of the stator core 31 in the radial direction via a gap 5, a plurality of permanent magnets 12 embedded in the rotor core 11, an end plate 13 arranged at one end of the rotor core 11 in the axial direction, an end plate 14 arranged at the other end of the rotor core 11 in the axial direction, a balancing member 15 arranged on a side opposite to the rotor core 11 with the end plate 13 therebetween, and a balancing member 16 disposed on a side opposite to the rotor core 11 with the end plate 14 therebetween. The rotation shaft 2 penetrates the center of each of the rotor core 11, the end plate 13, the balancing member 15, the end plate 14, and the balancing member 16.

In the electric motor configured in this manner, a rotating magnetic field is generated by supply of a current having a frequency synchronized with a commanded rotational frequency to the winding 33, so that the rotor 1 is rotated. An operation of the compressor 100 during rotation of the rotor 1 is described below. The refrigerant gas supplied from the accumulator 51 is taken into the cylinder 62 through the inlet pipe 52 that is fixed to the container 55. Also, rotation of the rotor 1 causes rotation of the eccentric portion 2a within the cylinder 62, so that the refrigerant is compressed by the piston 66. The compressed refrigerant of a high temperature passes through the upper discharge muffler 61 and the lower discharge muffler 63, passes through the gap 5 between the rotor 1 and the stator 3 and rises in the container 55, and then passes through a discharge pipe 54 provided in the container 55 to be supplied to a high-pressure side of a refrigeration cycle in a refrigeration cycle device (not illustrated).

Figure 2:
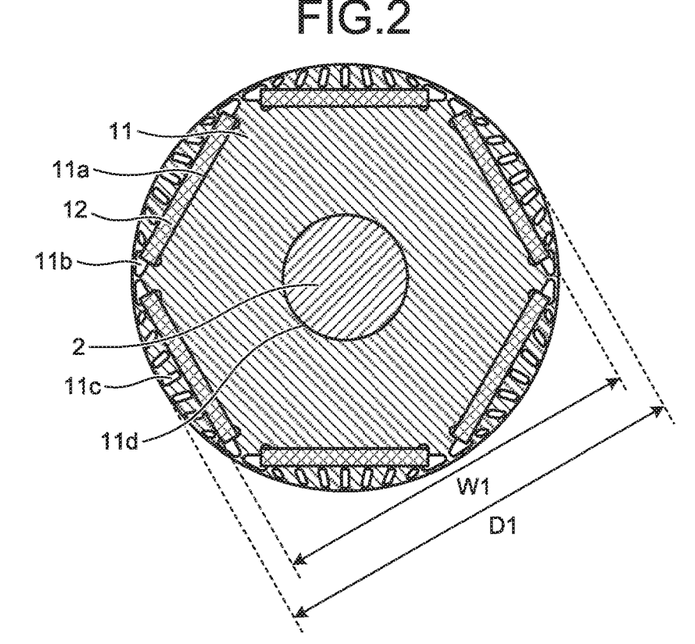
FIG. 2 is a horizontal cross-sectional view of a rotor core of the permanent-magnet-embedded electric motor for a compressor according to the embodiment of the present invention.

FIG. 2 is a horizontal cross-sectional view of a rotor core of the permanent-magnet-embedded electric motor for a compressor according to the embodiment of the present invention. The rotor core 11 includes a plurality of magnet insertion holes 11a that are formed to be away from each other in the rotational direction, correspondingly to the number of the magnetic poles, permanent magnets 12 each of which is inserted into each of the magnet insertion holes 11a, and an insertion hole 11d that is formed at the center of the rotor core 11 in the radial direction and into which the rotation shaft 2 is inserted. A cross-sectional shape of each of the magnet insertion holes 11a is a rectangle in which a width in the radial direction is narrower than a width in the rotational direction. Each of the magnet insertion holes 11a extends in the axial direction and penetrates the rotor core 11 from the one end to the other end thereof. Permanent magnets 12 having different polarities from each other are inserted into adjacent magnet insertion holes 11a. The permanent magnets 12 inserted into the magnet insertion holes 11a are alternately magnetized with an N-pole and an S-pole and are formed planar in shape.

As a method for fixing the permanent magnet 12, a method can be considered in which the permanent magnet 12 is press-fitted into the magnet insertion hole 11a or the permanent magnet 12 having an adhesive applied thereon is inserted into the magnet insertion hole 11a. The permanent magnet 12 may be any of a ferrite magnet and a rare-earth magnet.

The rotor core 11 has slits 11b that are formed at both end portions of each magnet insertion hole 11a in the rotational direction. Further, a plurality of slits 11c are formed on an outer side of the magnet insertion hole 11a in the radial direction in such a manner that the slits 11c are away from each other in the rotational direction. This group of slits is provided for reducing an electromagnetic exciting force of the electric motor.

As in the illustrated example, the rotor core 11 includes a plurality of pairs of magnet insertion holes 11a arranged to face to each other with the rotation shaft 2 therebetween. W1 represents the width of each pair of magnet insertion holes 11a in the radial direction, and D1 represents the outer diameter of the rotor core 11.

Figure 3:
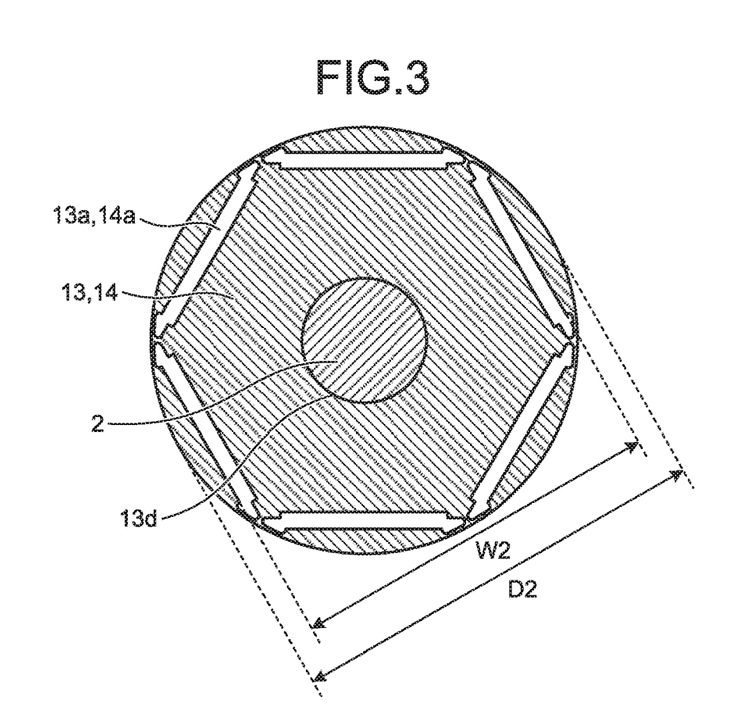
FIG. 3 is a horizontal cross-sectional view of an end plate of the permanent-magnet-embedded electric motor for a compressor according to the embodiment of the present invention.

FIG. 3 is a horizontal cross-sectional view of an end plate of the permanent-magnet-embedded electric motor for a compressor according to the embodiment of the present invention. Each of the two end plates 13 and 14 is formed of a magnetic material having higher permeability than permeability of a magnetic material of the rotor core 11, and has an insertion hole 13d formed in a center portion of each of the end plates 13 and 14 to allow insertion of the rotation shaft 2 thereinto. Further, the end plates are provided with through-holes 13a and 14a each communicating with corresponding one of the magnet insertion holes 11a formed in the rotor core 11 illustrated in FIG. 2. That is, each of the through-holes 13a and 14a is provided at a position facing to an end face in the axial direction of the permanent magnet 12 that is inserted into the magnet insertion hole 11a of the rotor core 11.

The two end plates 13 and 14 include a plurality of pairs of through-holes 13a and a plurality of pairs of through-holes 14a, respectively, in each of the pairs the through-holes face to each other with the rotation shaft 2 therebetween. W2 represents the width of each pair of through-holes 13a and each pair of through-holes 14a in the radial direction, and D2 represents the outer diameter of the end plates 13 and 14.

It is less likely that an electromagnetic exciting force acts on the end plates 13 and 14. Therefore, it is unnecessary to provide slits corresponding to the slits 11c illustrated in FIG. 2 in the end plates 13 and 14. Further, a ferromagnetic material used for the end plates 13 and 14 is formed by iron, such as steel or cast iron.

Figure 4:
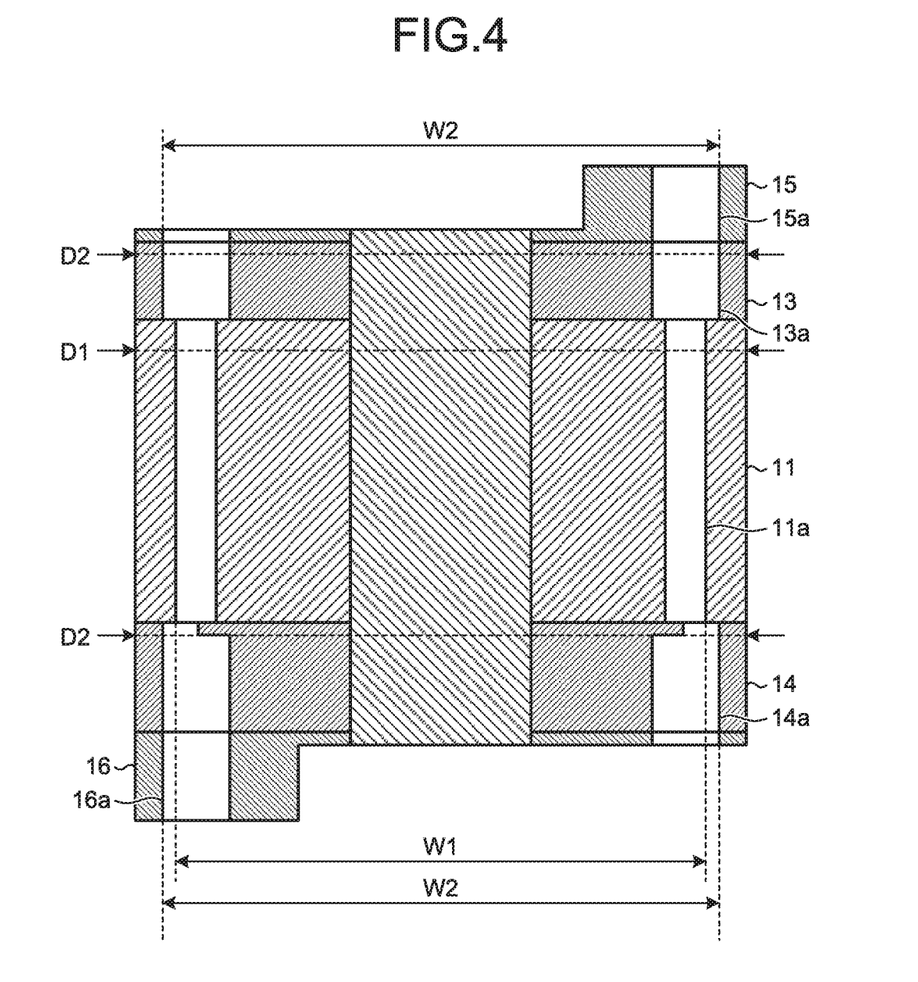
FIG. 4 is a vertical cross-sectional view of a set of a rotor core, two end plates, and two balancing members of the permanent-magnet-embedded electric motor for a compressor according to the embodiment of the present invention, from which permanent magnets are omitted.

FIG. 4 is a vertical cross-sectional view of a set of a rotor core, two end plates, and two balancing members of the permanent-magnet-embedded electric motor for a compressor according to the embodiment of the present invention, from which permanent magnets are omitted.

As illustrated in FIG. 4, the outer diameter D2 of each of the two end plates 13 and 14 is equal to the outer diameter D1 of the rotor core 11, and the width W2 in the radial direction of the pair of through-holes 13a and the pair of through-holes 14a formed in the two end plates 13 and 14, respectively, is wider than the width W1 in the radial direction of the pair of magnet insertion holes 11a formed in the rotor core 11. By providing the through-holes 13a and 14a in the respective two end plates 13 and 14, it is possible to suppress leakage magnetic fluxes flowing from end portions in the axial direction of the permanent magnets 12 illustrated in FIG. 2 toward the end plates 13 and 14, so that reduction of the efficiency of the electric motor can be suppressed.

Further, it is possible to effectively suppress the leakage magnetic fluxes leaking from the end portions of the permanent magnets 12 in the axial direction, because the width W2 of the pair of through-holes 13a and the pair of through-holes 14a in the radial direction is wider than the width W1 of the pair of magnet insertion holes 11a in the radial direction.

Also, by setting the outer diameter D2 of a plurality of electromagnetic steel plates forming the end plates 13 and 14 to be equal to the outer diameter D1 of electromagnetic steel plates forming the rotor core 11, it is possible to simultaneously stack the rotor core 11 and the end plates 13 and 14 by using an identical progressive die. Therefore, manufacturing steps can be simplified.

In addition, interlinkage of magnetic fluxes from the stator 3 illustrated in FIG. 1 hardly occurs in the end plates 13 and 14, and the end plates 13 and 14 have small iron loss. Therefore, a magnetic material having a higher iron loss value than that of the electromagnetic steel plates forming the rotor core 11 may be used for the electromagnetic steel plates forming the end plates 13 and 14. This can reduce a material cost of the end plates 13 and 14.

Furthermore, the balancing members 15 and 16 are provided at end portions of the end plates 13 and 14 illustrated in FIG. 4, respectively. Because of rotation of the rotor 1 illustrated in FIG. 1, deflection is caused in the rotation shaft 2 by a centrifugal force acting on the eccentric portion 2a. An axial center of the rotor core 11 is inclined with respect to an axial center of the stator core 31 because of the deflection of the rotation shaft 2, so that the rotor 1 is distorted, the distortion of the rotor 1 can be canceled by providing the balancing members 15 and 16, and it is possible to suppress vibration and noise of the electric motor.

The balancing members 15 and 16 are formed of a magnetic material that is more ferromagnetic than the magnetic material of the rotor core 11, or are formed of a nonmagnetic material.

In a case where the balancing members 15 and 16 are formed of a ferromagnetic material, a plurality of through-holes 15a and a plurality of through-holes 16a communicating with the through-holes 13a and the through-holes 14a formed in the end plates 13 and 14, respectively, are formed in the balancing members 15 and 16, respectively. By providing the through-holes 15a and the through-holes 16a in the balancing members 15 and 16, respectively, it is possible to effectively suppress the leakage magnetic fluxes leaking from the end portions in the axial direction of the permanent magnets illustrated in FIG. 2 without using an expensive nonmagnetic material. This can reduce the material cost.

In a case where the balancing members 15 and 16 are formed of a nonmagnetic material, it is unnecessary to form the through-holes 15a and 16a in the balancing members 15 and 16, respectively. Therefore, a specific gravity of the balancing members 15 and 16 formed of a nonmagnetic material is larger than that of the balancing members 15 and 16 formed of a ferromagnetic material, and inertia of the rotor 1 illustrated in FIG. 1 can be increased. Accordingly, in a case of using the balancing members 15 and 16 formed of a nonmagnetic material in the rotor 1 illustrated in FIG. 1, it is possible to cancel the distortion of the rotor 1 caused by rotation of the eccentric portion 2a illustrated in FIG. 1, and to further suppress vibration and noise of the electric motor.

The balancing members 15 and 16 may be formed by stacking a plurality of electromagnetic steel plates. With this configuration, it is possible to simultaneously stack the rotor core 11, the end plates 13 and 14, and the balancing members 15 and 16 by using an identical progressive die, so that manufacturing steps can be simplified.

In a case where the length in the axial direction of the rotor 1 including the rotor core 11 and the two end plates 13 and 14 is larger than the length in the axial direction of the stator core 31 illustrated in FIG. 1, only one of the two end plates 13 and 14 may be attached in the rotor 1. In a case of attaching a lower end plate 14 that is close to a bearing (not illustrated) provided in the compressor 100 illustrated in FIG. 1, it is possible to effectively suppress vibration and noise caused by the distortion of the rotor 1. In a case of using the two end plates 13 and 14, the same effect can be also achieved by setting the length of the lower end plate 14 in the axial direction to be larger than the length of the upper end plate 13 in the axial direction.

Figure 5:
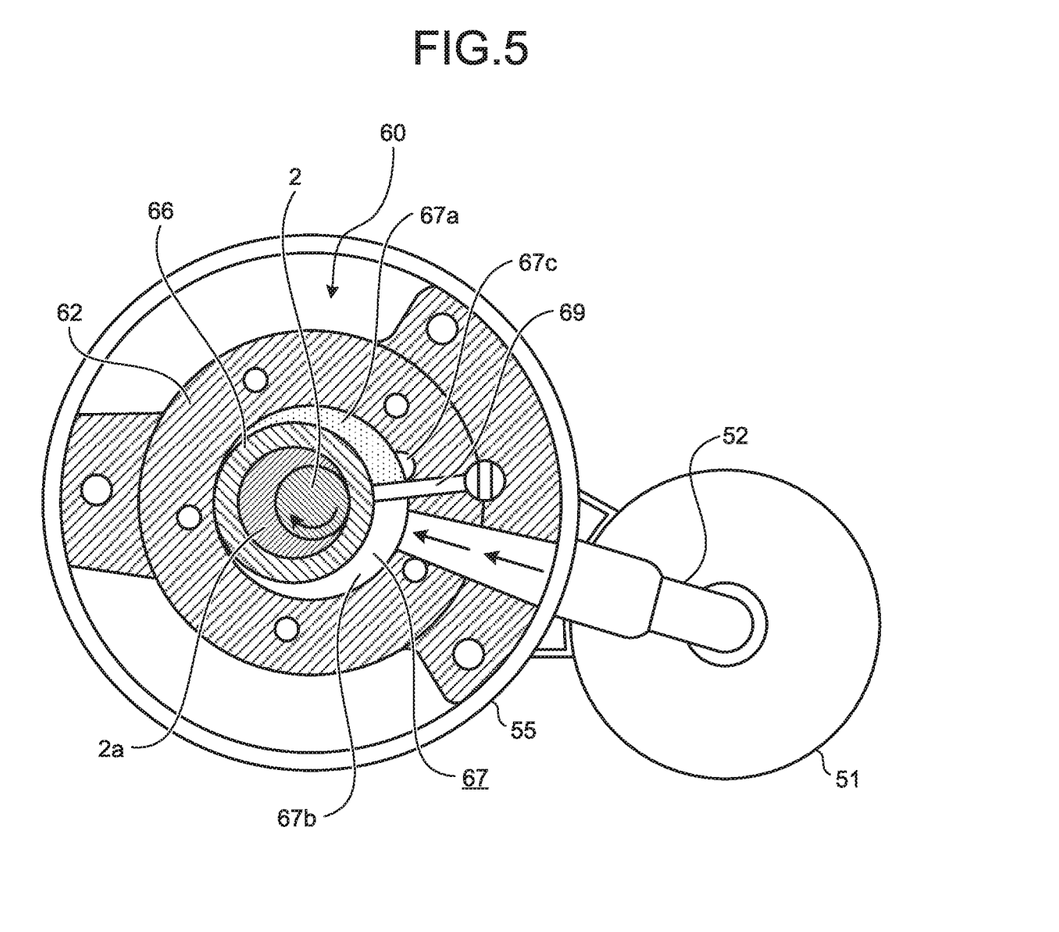
FIG. 5 is a horizontal cross-sectional view of a compression mechanism unit incorporated in a compressor according to the embodiment of the present invention.
Figure 6:
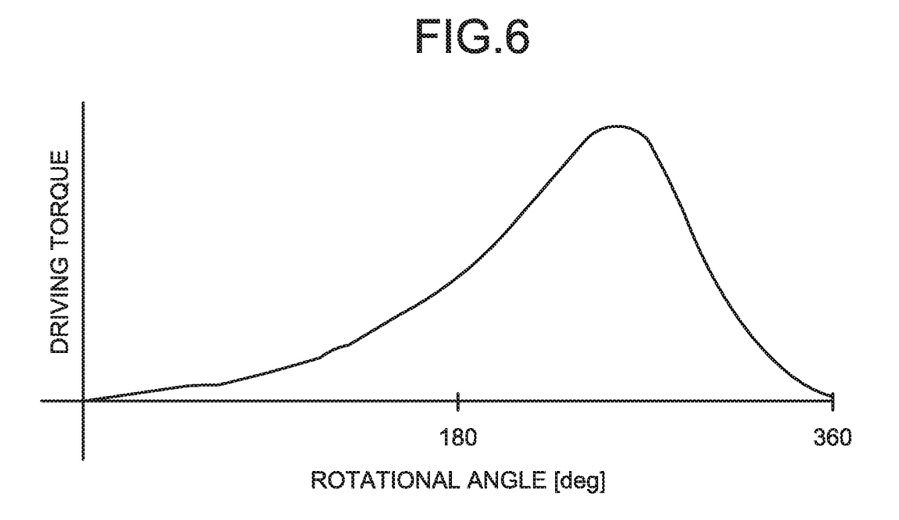
FIG. 6 is a diagram illustrating a change of a driving torque during one revolution of a rotor incorporated in the compressor according to the embodiment of the present invention.

FIG. 5 is a horizontal cross-sectional view of a compression mechanism unit incorporated in a compressor according to the embodiment of the present invention. FIG. 6 illustrates a change of a driving torque during one revolution of a rotor incorporated in the compressor according to the embodiment of the present invention. The horizontal axis in FIG. 6 represents a rotational angle of the rotor 1 illustrated in FIG. 1, and the vertical axis represents the driving torque. As illustrated in FIG. 5, the compression mechanism unit 60 is fixed to the inner circumferential surface of the container 55. The compression mechanism unit 60 includes the cylinder 62, the piston 66 that is formed to be freely rotatable together with the eccentric portion 2a and is fitted to an inner circumferential portion of the cylinder 62, and a cylinder chamber 67 provided in the inner circumferential portion of the cylinder 62. The cylinder 62 has the cylinder chamber 67 that communicates with the inlet pipe 52 and that is provided with a discharge port 67c. The cylinder chamber 67 is configured by a low-pressure chamber 67b communicating with the inlet pipe 52, a high-pressure chamber 67a communicating with the discharge port 67c, and a vane 69 that sections the low-pressure chamber 67b and the high-pressure chamber 67a.

When rotation of the rotor 1 illustrated in FIG. 1 is caused by energization of an inverter (not illustrated), the piston 66 provided to the rotation shaft 2 rotates within the cylinder 62. In this rotation, a refrigerant gas is taken into the cylinder chamber 67 through the inlet pipe 52, and the taken refrigerant gas is compressed in the cylinder chamber 67 and is then discharged from the discharge port 67c. A large pressure change, that is, a change of a driving torque occurs on the rotation shaft 2 during one revolution of the rotor 1.

Figure 7:
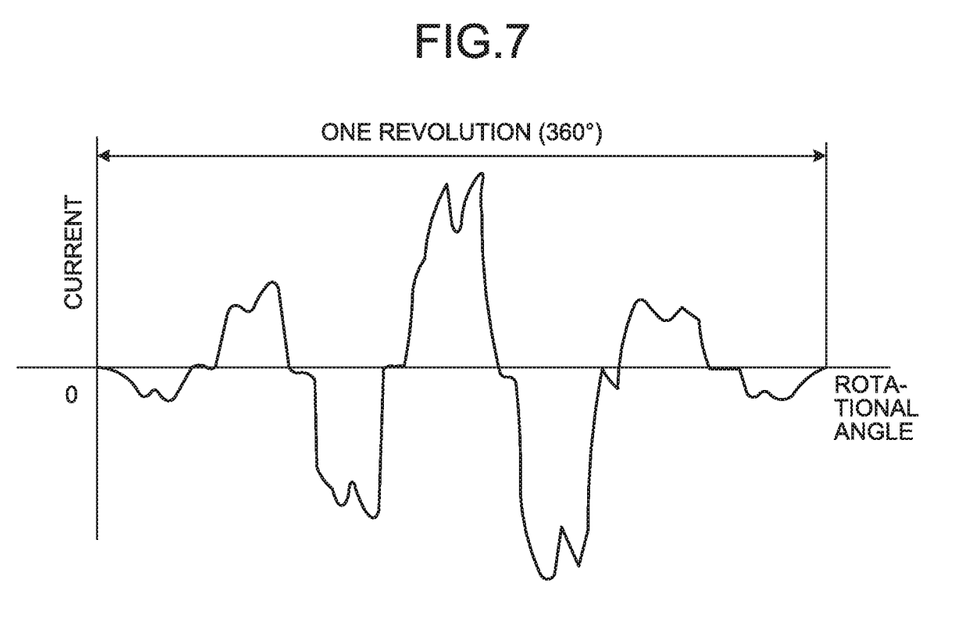
FIG. 7 is a diagram illustrating a current waveform when an electric motor incorporating a rotor in which an end plate is not attached is driven by an inverter in 120-degree rectangular wave driving.
Figure 8:
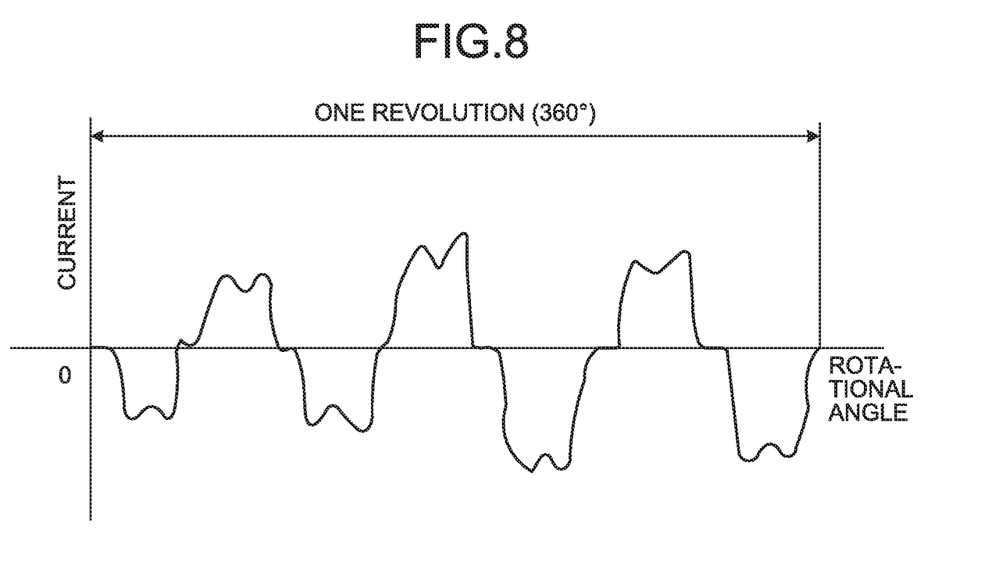
FIG. 8 is a diagram illustrating a current waveform when an electric motor incorporating a rotor in which an end plate is attached is driven by an inverter in 120-degree rectangular wave driving.

FIG. 7 illustrates a current waveform when an electric motor incorporating a rotor in which an end plate is not attached is driven by an inverter in 120-degree rectangular wave driving. FIG. 8 illustrates a current waveform when an electric motor incorporating a rotor in which an end plate is attached is driven by an inverter in 120-degree rectangular wave driving. The horizontal axis in each of FIGS. 7 and 8 represents a rotational angle of the rotor 1 illustrated in FIG. 1, and the vertical axis represents a waveform of a current flowing through the electric motor.

While a large current pulsation occurs during one revolution of the rotor in the electric motor incorporating the rotor in which the end plates 13 and 14 are not attached, as illustrated in FIG. 7, the current pulsation during one revolution of the rotor is decreased in the electric motor incorporating the rotor in which the end plates 13 and 14 are attached, as illustrated in FIG. 8. The rotor core 11 of the embodiment of the present invention is provided with the end plates 13 and 14 having the outer diameter which is equal to that of the rotor core 11. Therefore, it is possible to increase an inertial force of the rotor, so that vibration and noise of the electric motor can be suppressed. Although FIGS. 7 and 8 illustrate examples in which an electric motor is driven in 120-degree rectangular wave driving, a driving method for the electric motor is not limited to 120-degree rectangular wave driving. In the electric motor according to the embodiment of the present invention, the same effect can be achieved by any driving method, for example, driving with a 120 or more degree rectangular wave or sine wave driving.

Figure 9:
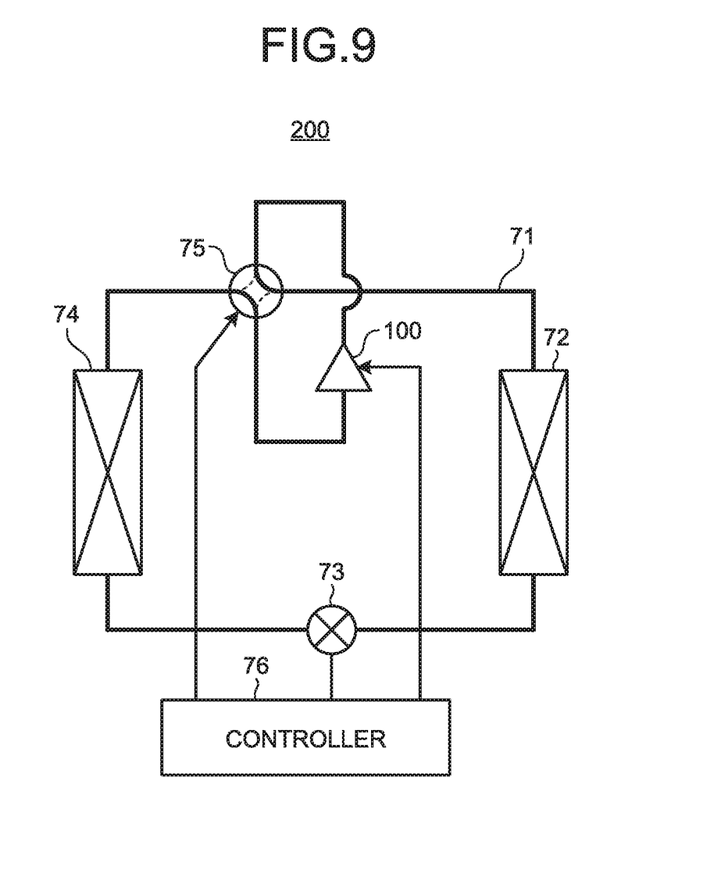
FIG. 9 is a configuration diagram of a refrigeration cycle device having the compressor according to the embodiment of the present invention mounted thereon.

FIG. 9 is a configuration diagram of a refrigeration cycle device having a compressor according to the embodiment of the present invention mounted thereon. A refrigeration cycle device 200 is configured by the compressor 100, a four-way valve 75, a condenser 72 that performs heat exchange between heat of a high-temperature and high-pressure refrigerant gas compressed in the compressor 100 and air to condense the refrigerant gas into a liquid refrigerant, an expander 73 that causes the liquid refrigerant to expand to obtain a low-temperature and low-pressure liquid refrigerant, an evaporator 74 that takes in heat from the low-temperature and low-pressure liquid refrigerant to obtain a low-temperature and low-pressure gas refrigerant, and a controller 76 that controls the compressor 100, the expander 73, and the four-way valve 75. The compressor 100, the four-way valve 75, the condenser 72, the expander 73, and the evaporator 74 are mutually connected by refrigerant piping 71 to configure a refrigeration cycle. By using the compressor 100, it is possible to provide the refrigeration cycle device 200 that is highly efficient and has a high output. The refrigeration cycle device 200 is suitable for an air conditioner, for example.

An operation of the refrigeration cycle device 200 is described below. During a normal operation of the refrigeration cycle device 200, a refrigeration cycle is performed in which a refrigerant circulates in the compressor 100, the condenser 72, the expander 73, and the evaporator 74 in that order and then returns to the compressor 100 again. The high-temperature and high-pressure refrigerant gas compressed in the compressor 100 is condensed into the liquid refrigerant by heat exchange with air in the condenser 72. The liquid refrigerant expands in the expander 73 to become a low-temperature and low-pressure refrigerant gas, the refrigerant gas is subjected to heat exchange with air and is evaporated in the evaporator 74, and is compressed again in the compressor 100 to become a high-temperature and high-pressure refrigerant gas.

By using the compressor 100 in the refrigeration cycle device 200, it is possible to provide the refrigeration cycle device 200 that can achieve reduction of both vibration and noise while suppressing the cost.

Although the end plates 13 and 14 are provided at both one end and the other end of the rotor core 11, respectively, in the embodiment of the present invention, the end plate 13 or 14 may be provided only at one end or the other end of the rotor core 11. Also, each of the end plates 13 and 14 is not limited to a stack of electromagnetic steel plates, but may be an integrated end plate obtained by processing iron, such as steel other than an electromagnetic steel plate or cast iron. Further, although six permanent magnets 12 are inserted into the rotor core 11 in the embodiment of the present invention, seven or more permanent magnets 12 may be used. Furthermore, although the through-holes 13a and 14a each communicating with corresponding one of the magnet insertion holes 11a and extending in the axial direction of the rotor 1 are formed in the end plates 13 and 14, respectively, in the embodiment of the present invention, the number of the through-holes 13a and 14a is not limited to the number in the illustrated example. For example, one or a plurality of through-holes 13a extending in the axial direction of the rotor 1 may be provided in the end plate 13 so as to communicate with at least one of the magnet insertion holes 11a. Similarly, one or a plurality of through-holes 14a extending in the axial direction of the rotor 1 may be provided in the end plate 14 so as to communicate with at least one of the magnet insertion holes 11a. Also in this configuration, it is possible to increase an inertial force of the rotor 1 while the leakage magnetic fluxes flowing from the end portions of the permanent magnets 12 in the axial direction toward the end plates 13 and 14 are suppressed, and it is possible to suppress vibration and noise of the electric motor while reduction of the efficiency of the electric motor is suppressed.

As described above, the permanent-magnet-embedded electric motor 4 for a compressor according to the embodiment of the present invention includes the stator core 31 and the rotor 1. The rotor 1 includes the rotor core 11 having the plurality of magnet insertion holes 11a and the end plates 13 and 14 disposed on end portions of the rotor core 11 in the axial direction. The outer diameter of the end plates 13 and 14 is equal to the outer diameter of the rotor core 11. The end plates 13 and 14 are formed of a magnetic material having higher permeability than permeability of a magnetic material of the rotor core 11. The end plates 13 and 14 have the through-holes 13a and 14a, respectively, each communicating with corresponding one of the magnet insertion holes 11a. With this configuration, it is possible to increase an inertial force of the rotor 1 while leakage magnetic fluxes flowing from end portions of the permanent magnets 12 in the axial direction toward the end plates 13 and 14 are suppressed. Therefore, it is possible to suppress vibration and noise of an electric motor while reduction of the efficiency of the electric motor is suppressed. Further, because the outer diameter of the end plates 13 and 14 is equal to the outer diameter of the rotor core 11 in the embodiment of the present invention, the length of the rotor 1 in the axial direction is suppressed, so that the compressor 100 that is compact and in a low cost can be achieved. Furthermore, by using the permanent-magnet-embedded electric motor 4 for a compressor according to the embodiment of the present invention in the compressor 100, it is possible to suppress noise that propagates through and is generated in the container 55, the discharge pipe 54, and the inlet pipe 52 of the compressor 100, so that it is possible to reduce noise of household electrical appliances having the compressor 100 mounted thereon, such as an air conditioner or a refrigerator.

The configurations described in the above embodiment are only examples of the content of the present invention. The configurations can be combined with other well-known techniques, and a part of each configuration can be omitted or modified without departing from the scope of the present invention.

The invention claimed is:
1. A compressor comprising:
a compressor mechanism that is arranged in a container and compresses a refrigerant gas supplied to the compressor mechanism, and
a permanent-magnet-embedded electric motor installed in the container and drives the compressor mechanism via a rotation shaft, wherein
the compressor mechanism includes: a cylinder to which the refrigerant gas is supplied; and a piston, which is located in the cylinder and eccentrically rotates within the cylinder together with an eccentric portion provided on one end of the rotating shaft,
another end of the rotating shaft is inserted into a rotor core constituting the electric motor, and the one end of the rotating shaft penetrates through an inner space of the cylinder and is held by an upper frame and a lower frame to be freely rotatable, and
the electric motor includes: an annular stator fixed within the container; and a rotor, which is located on an inner side of the stator,
the rotor includes the rotor core, which includes a plurality of magnet insertion holes, an upper end plate, and a lower end plate,
each of the upper end plate and the lower end plate is correspondingly disposed on end portions of the rotor core in an axial direction of the rotor core,
an outer diameter of the upper end plate and the lower end plate is equal to an outer diameter of the rotor core,
a plurality of end plate through-holes formed in the upper end plate and the lower end plate, wherein each of the end plate through-holes extends in the axial direction of the rotor core, and each of the end plate through holes corresponds to one of the magnet insertion holes, and
each of the end plate through-holes faces an end face of a corresponding permanent magnet inserted into each of the magnet insertion holes in the axial direction, wherein
the rotation shaft penetrates the rotor core and the upper end plate and the lower end plate,
the rotor core includes a plurality of magnet insertion holes arranged in pairs to face each other with the rotation shaft therebetween,
the end plate through-holes are arranged in pairs to face each other with the rotation shaft therebetween,
the end face of each of the permanent magnets is not located within the corresponding one of the end plate through-holes to which the permanent magnet faces,
a width of each of the pairs of end plate through holes in a radial direction is greater than a width of each of the pairs of magnetic insertion holes in the radial direction in the rotor core, and
a length of the lower end plate, which is closer to the compressor mechanism compared to the upper end plate in the axial direction, is larger than a length of the upper end plate in the axial direction.
2. The rotor according to claim 1, wherein each of the upper end plate and the lower end plate is configured by stacking a plurality of electromagnetic steel plates.
3. The rotor according to claim 1, wherein each of the lower end plate and the upper end plate is formed of a magnetic material having a higher iron loss value than an iron loss value of the rotor core.
4. The rotor according to claim 1, wherein a balancing member is arranged on a surface of each of the upper end plate and the lower end plate that is opposite to a surface that is in contact with the rotor core.

5. The rotor according to claim 4, wherein the balancing member is formed of a nonmagnetic material.

6. The rotor according to claim 4, wherein
the balancing member is formed of a magnetic material having higher permeability than permeability of a magnetic material of the rotor core, and
a plurality of balancing member through-holes formed in the balancing member, wherein each of the balancing member through holes communicates with a corresponding one of the end plate through-holes.

7. The rotor according to claim 4, wherein the balancing member is configured by stacking a plurality of electromagnetic steel plates.

8. A refrigeration cycle device comprising the compressor according to claim 1.

* * * * *